(12) United States Patent
Trisel

(10) Patent No.: US 9,049,847 B1
(45) Date of Patent: Jun. 9, 2015

(54) AQUARIUM FISH PARTITION DEVICE

(71) Applicant: Karen L. Trisel, Ohio City, OH (US)

(72) Inventor: Karen L. Trisel, Ohio City, OH (US)

( * ) Notice: Subject to any disclaimer, the term of this patent is extended or adjusted under 35 U.S.C. 154(b) by 80 days.

(21) Appl. No.: 14/085,316

(22) Filed: Nov. 20, 2013

(51) Int. Cl.
*A01K 63/00* (2006.01)

(52) U.S. Cl.
CPC .................. *A01K 63/006* (2013.01)

(58) Field of Classification Search
USPC ......... 119/251, 245, 246, 247, 248, 252, 253, 119/256, 221; D30/101, 105, 106
See application file for complete search history.

(56) References Cited

U.S. PATENT DOCUMENTS

| | | | |
|---|---|---|---|
| 3,304,912 A | | 2/1967 | Hackman et al. |
| 3,512,503 A | | 5/1970 | Willinger |
| 3,561,402 A | * | 2/1971 | Ishida et al. ............... 119/221 |
| 4,029,050 A | * | 6/1977 | Genest ....................... 119/201 |
| 4,126,102 A | * | 11/1978 | Galloway ................... 119/269 |
| 5,144,909 A | | 9/1992 | Tominaga |
| D345,631 S | * | 3/1994 | Marshall et al. ........... D30/106 |
| 5,957,084 A | * | 9/1999 | Knepp ........................ 119/245 |
| D525,396 S | | 7/2006 | Salvati et al. |
| D570,555 S | | 6/2008 | Kilroy |
| 8,025,031 B1 | | 9/2011 | Fox |
| D658,539 S | | 5/2012 | Harshman |
| 8,720,377 B1 | * | 5/2014 | McLean ..................... 119/251 |
| 2009/0250011 A1 | * | 10/2009 | Biggs ......................... 119/246 |
| 2012/0042832 A1 | | 2/2012 | Trisel |

FOREIGN PATENT DOCUMENTS

WO    WO03102111    12/2003

* cited by examiner

*Primary Examiner* — Trinh Nguyen

(57) ABSTRACT

An aquarium fish partition device separates an aggressive fish from other fish within an aquarium. The device includes a base, a top, and an inner perimeter wall extending between the base and the top defining a central interior space. An outer perimeter wall extends between the base and the top defining a medial space between the inner perimeter wall and the outer perimeter wall. Each of a plurality of slits extends through the inner perimeter wall wherein the central interior space is in fluid communication with the medial space. Each of a plurality of slots extends through the outer perimeter wall wherein the medial space is configured to be in fluid communication with an area outside of the outer perimeter wall. The slits are offset from the slots such that the inner perimeter wall and the outer perimeter wall are configured for retaining a fish in the central interior space.

13 Claims, 3 Drawing Sheets

AQUARIUM FISH PARTITION DEVICE

BACKGROUND OF THE DISCLOSURE

Field of the Disclosure

The disclosure relates to partition devices and more particularly pertains to a new partition device for separating an aggressive type of fish from other fish within an aquarium.

SUMMARY OF THE DISCLOSURE

An embodiment of the disclosure meets the needs presented above by generally comprising a base, a top, and an inner perimeter wall coupled to and extending between the base and the top. The inner perimeter wall defines a central interior space. An outer perimeter wall is coupled to and extends between the base and the top defining a medial space between the inner perimeter wall and the outer perimeter wall. Each of a plurality of slits extends through the inner perimeter wall wherein the central interior space is in fluid communication with the medial space. Each of a plurality of slots extends through the outer perimeter wall wherein the medial space is configured to be in fluid communication with an area outside of the outer perimeter wall. The slits are offset from the slots such that the inner perimeter wall and the outer perimeter wall are configured for retaining a fish in the central interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
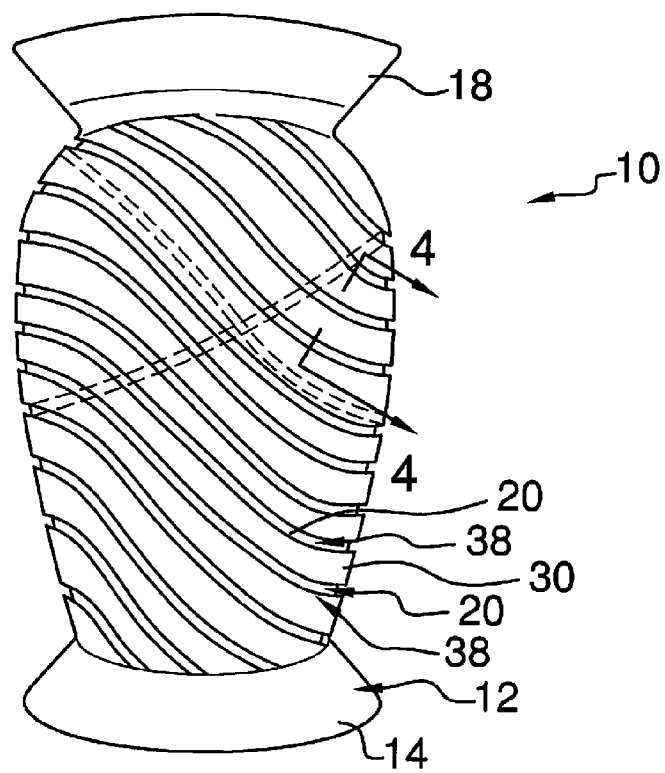
FIG. 1 is a front view of a aquarium fish partition device according to an embodiment of the disclosure.
Figure 2:
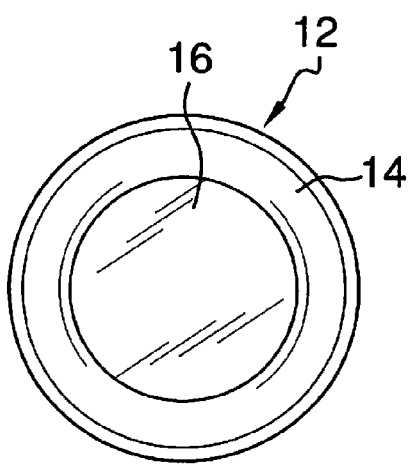
FIG. 2 is a bottom view of an embodiment of the disclosure.
Figure 3:
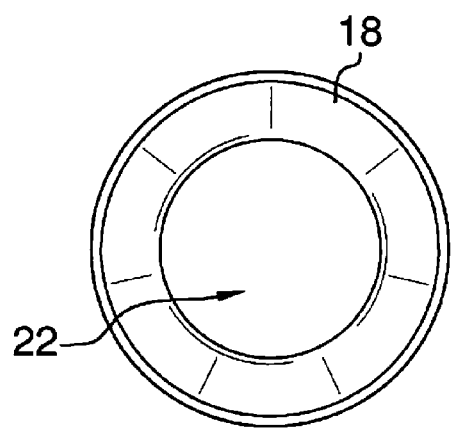
FIG. 3 is a top view of an embodiment of the disclosure.
Figure 4:
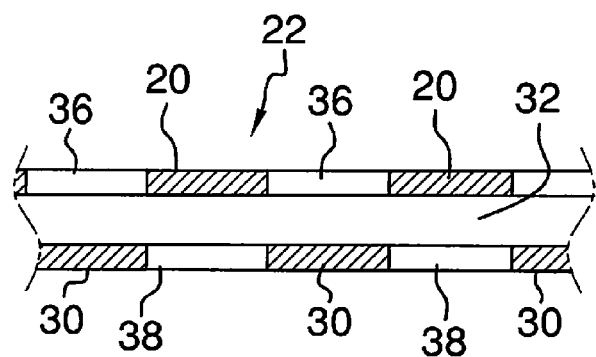
FIG. 4 is a partial cross-sectional view of an embodiment of the disclosure taken along line 4-4 of FIG. 1.
Figure 5:
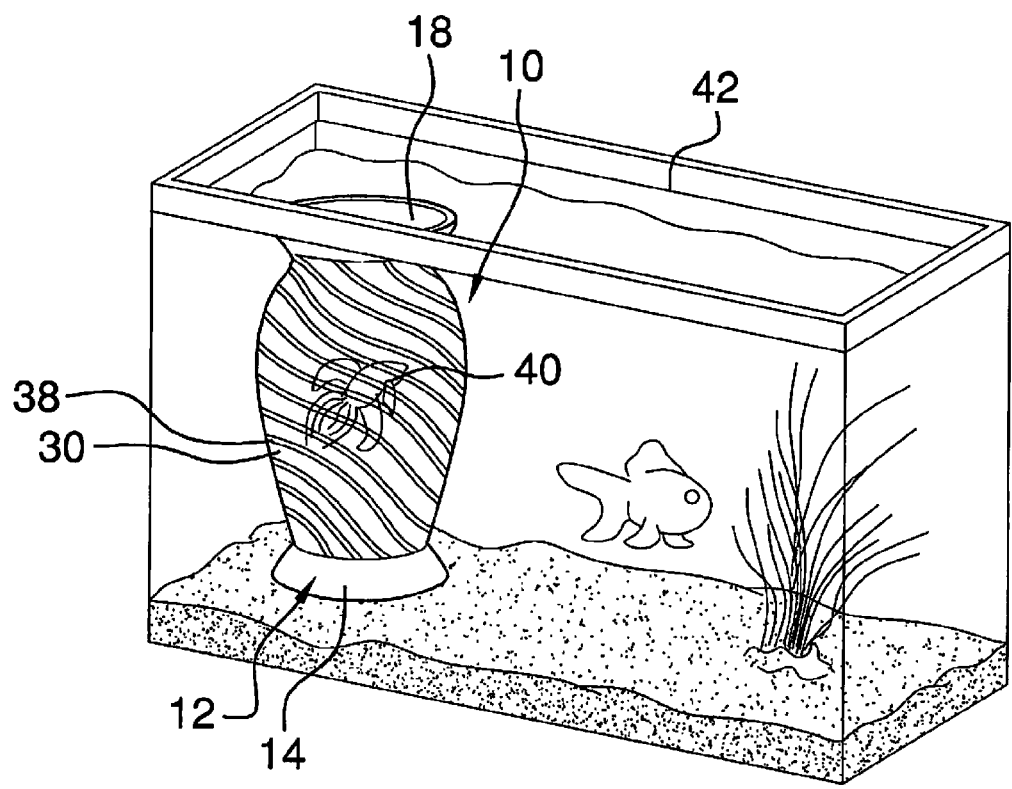
FIG. 5 is a top front side perspective view of an embodiment of the disclosure in use.

With reference now to the drawings, and in particular to FIGS. 1 through 5 thereof, a new partition device embodying the principles and concepts of an embodiment of the disclosure and generally designated by the reference numeral 10 will be described.

As best illustrated in FIGS. 1 through 5, the aquarium fish partition device 10 generally comprises a base 12 and a top 18. The base 12 comprises an outer ring section 14 and a bottom wall 16 coupled to and extending inwardly from the outer ring section 14. An inner perimeter wall 20 is coupled to and extends between the base 12 and the top 18. The inner perimeter wall 20 defines a central interior space 22. The top 18 is annular defining an opening 24 into the central interior space 22. The bottom wall 16 closes a bottom 26 of the central interior space 22. An outer perimeter wall 30 is coupled to and extends between the base 12 and the top 18. The outer perimeter wall 30 is spaced from the inner perimeter wall 20. The spacing may be substantially even and constant extending between the base 12 and the top 18. The outer perimeter wall 30 defines a medial space 32 between the inner perimeter wall 20 and the outer perimeter wall 30. The top 18 may be outwardly flared extending away from the outer perimeter wall 30. The outer ring section 14 may also be outwardly flared extending away from the outer perimeter wall 30. The bottom wall 16 closes a bottom 34 of the medial space 32.

A plurality of slits 36 extends through the inner perimeter wall 20 wherein the central interior space 22 is in fluid communication with the medial space 32. Each slit 36 may have a consistent width extending along a full length of the slit 36. Each slit 36 may take a curved or circuitous path spiraling around the inner perimeter wall 20 between the base 12 and the top 18. A plurality of slots 38 extends through the outer perimeter wall 30 wherein the medial space 32 is configured to be in fluid communication with an area outside of the outer perimeter wall 30. Each slot 38 may have a consistent width extending along a full length of the slot 38. Each slot 38 may also take a curved or circuitous path spiraling around the outer perimeter wall 30 between the base 12 and the top 18. The slits 36 are offset from the slots 38 such that the inner perimeter wall 20 and the outer perimeter wall 30 are configured for retaining a fish 40 in the central interior space 22. The slits 36 and slots 38 may be arranged such that the slits 36 and slots 38 are not overlapped between the inner perimeter wall 20 and the outer perimeter wall 30.

Each of the interior perimeter wall 20 and the outer perimeter wall 30 may be translucent or transparent such that the central interior space is visible to permit viewing of the fish 40 in an aquarium 42.

In use, the device 10 is positioned in the aquarium 42 and the fish 40 is placed in the central interior space 22 wherein the fish 40 is restricted from access to the rest of the aquarium 42. Thus, an aggressive species such as a betta, may be partitioned from but displayed with other fish within the aquarium 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aquarium fish partition device comprising:
   a base;
   a top;
   an inner perimeter wall coupled to and extending between said base and said top, said inner perimeter wall defining a central interior space;
   an outer perimeter wall coupled to and extending between said base and said top, said outer perimeter wall being spaced from said inner perimeter wall defining a medial space between said inner perimeter wall and said outer perimeter wall;
   a plurality of slits extending through said inner perimeter wall wherein said central interior space is in fluid communication with said medial space and each said slit spiraling around said inner perimeter wall between said base and said top;
   a plurality of slots extending through said outer perimeter wall wherein said medial space is configured to be in fluid communication with an area outside of said outer perimeter wall, said slits being offset from said slots such that said inner perimeter wall and said outer perimeter wall are configured for retaining a fish in said central interior space and each said slot spiraling around said outer perimeter wall between said base and said top.

2. The device of claim 1, further comprising said interior perimeter wall and said outer perimeter wall each being translucent.

3. The device of claim 1, further comprising said interior perimeter wall and said outer perimeter wall each being transparent.

4. The device of claim 1, further comprising said top being outwardly flared extending away from said outer perimeter wall.

5. The device of claim 4, further comprising said top being annular defining an opening into said central interior space.

6. The device of claim 1, further comprising said base comprising an outer ring section being outwardly flared extending away from said outer perimeter wall.

7. The device of claim 6, further comprising said base comprising a bottom wall coupled to and extending inwardly from said outer ring section wherein a bottom of said central interior space and a bottom of said medial space are each closed.

8. The device of claim 1, further comprising each said slit having a consistent width extending along a full length of said slit.

9. The device of claim 1, further comprising each said slot having a consistent width extending along a full length of said slot.

10. The device of claim 1, further comprising:
    each said slit having a consistent width extending along a full length of said slit; and
    each said slot having a consistent width extending along a full length of said slot.

11. An aquarium fish partition device comprising:
    a base, said base comprising an outer ring section and a bottom wall coupled to and extending inwardly from said outer ring section;
    a top;
    an inner perimeter wall coupled to and extending between said base and said top, said inner perimeter wall defining a central interior space, said top being annular defining an opening into said central interior space, said bottom wall closing a bottom of said central interior space;
    an outer perimeter wall coupled to and extending between said base and said top, said outer perimeter wall being spaced from said inner perimeter wall defining a medial space between said inner perimeter wall and said outer perimeter wall, said top being outwardly flared extending away from said outer perimeter wall, said outer ring section being outwardly flared extending away from said outer perimeter wall, said bottom wall closing a bottom of said medial space;
    a plurality of slits extending through said inner perimeter wall wherein said central interior space is in fluid communication with said medial space, each said slit having a consistent width extending along a full length of said slit, each said slit spiraling around said inner perimeter wall between said base and said top;
    a plurality of slots extending through said outer perimeter wall wherein said medial space is configured to be in fluid communication with an area outside of said outer perimeter wall, each said slot having a consistent width extending along a full length of said slot, said slits being offset from said slots such that said inner perimeter wall and said outer perimeter wall are configured for retaining a fish in said central interior space, each said slot spiraling around said outer perimeter wall between said base and said top.

12. The device of claim 11, further comprising said interior perimeter wall and said outer perimeter wall each being translucent.

13. The device of claim 11, further comprising said interior perimeter wall and said outer perimeter wall each being transparent.

* * * * *